United States Patent [19]

Hill et al.

[11] Patent Number: 5,266,158

[45] Date of Patent: Nov. 30, 1993

[54] PROCESS FOR THE COLOUR STRIPPING AND BLEACHING OF COLOURED WASTE PAPER

[75] Inventors: Roy T. Hill, Seabrook; Patricia B. Walsh, Kingwood, both of Tex.

[73] Assignee: Interox America, Houston, Tex.

[21] Appl. No.: 848,065

[22] Filed: Mar. 9, 1992

[51] Int. Cl.$^5$ .................................................. D21C 5/02
[52] U.S. Cl. ........................................ 162/7; 162/6; 162/5
[58] Field of Search ................................... 162/5, 6, 7

[56] References Cited

U.S. PATENT DOCUMENTS

| | | | |
|---|---|---|---|
| 441,462 | 11/1890 | Barnes | 162/8 |
| 1,791,445 | 2/1931 | Grenaudier | 162/8 |
| 2,221,294 | 11/1940 | Bragg | 162/8 |
| 2,582,496 | 1/1952 | Massey et al. | 162/6 |
| 3,565,927 | 2/1971 | Wakeman | 162/8 |
| 4,076,578 | 2/1978 | Puddington et al. | 162/8 |
| 4,264,412 | 4/1981 | Hasler et al. | 162/6 |
| 4,332,638 | 6/1982 | Mauer et al. | 162/4 |
| 4,360,402 | 11/1982 | Ortner et al. | 162/5 |
| 4,548,674 | 10/1985 | Hagman | 162/6 |

FOREIGN PATENT DOCUMENTS

| | | | |
|---|---|---|---|
| 684453 | 4/1964 | Canada | 162/6 |
| 26019 | of 1912 | United Kingdom . | |

OTHER PUBLICATIONS

Haekh's Chemical Dictionary, 5th Edition, McGraw-Hill Book Company (New York), 1987, p. 468.

Pulp and Paper Manufacture, Third Edition, vol. 3, Secondary Fibers and Non-Wood Pulping, p. 234, 1987, R. P. Singh, "A Color Stripping".

*Primary Examiner*—W. Gary Jones
*Assistant Examiner*—Brenda A. Lamb
*Attorney, Agent, or Firm*—Oblon, Spivak, McClelland, Maier & Neustadt

[57] ABSTRACT

Process for color stripping and bleaching of colored waste paper by treatment by means of monoperoxysulphuric acid or of one of its salts, according to which the treatment is performed in the presence of a halide ion.

10 Claims, No Drawings

PROCESS FOR THE COLOUR STRIPPING AND BLEACHING OF COLOURED WASTE PAPER

FIELD OF THE INVENTION

The invention relates to a process for the colour stripping and bleaching of waste paper with a view to its recycling. It is more particularly concerned with coloured waste paper.

DISCUSSION OF THE BACKGROUND

The papermaking industry employs cellulose fibres originating from wood as a principal source of raw materials. Among these, fibres originating from recycled waste paper constitute an increasingly important source. This waste paper is usually disintegrated in an aqueous phase, in most cases in a pulper, so as to obtain a pulp which is generally employed as such or as a mixture with unrecycled cellulose pulp for the manufacture of packaging paper and cardboard and of newsprint. Since the proportion of recovered cellulose fibres frequently reaches a high level which it is very difficult to exceed, other outlets have also been envisaged for waste paper, namely: its incorporation in pulps intended for the manufacture of printing and writing paper and of tissue paper. In this case it is important to have available pulp which exhibits a high brightness level. This high brightness level can usually be achieved by means of deinking and/or bleaching treatments.

Recycling of waste paper encounters a considerable obstacle in the presence, in a high proportion thereof, of dyes of various kinds. These prove very difficult to neutralise, given that they remain solidly attached to the cellulose fibres and can be stripped only under operating conditions which are very frequently damaging to the cellulose fibres themselves.

In the case of some categories of waste paper such as, for example, waste paper from carbonless copy paper (CCP), it has been possible to strip it by subjecting it to a treatment by means of a peroxide compound in an alkaline medium (U.S. Pat. 4,381,969 in the name of Interox).

A treatment capable of permitting the colour stripping of coloured waste paper from all sources consists in pulping this paper and next subjecting it to a treatment by means of an alkali metal or alkaline-earth metal hypochlorite (Pulp and Paper Manufacture, 3rd Edition, Vol. 3, Secondary Fibers and Non-Wood Pulping, F. Hamilton, B. Leopold and M.J. Kocurek, 1987, The Joint Textbook Committee of The Paper Industry TAPPI CPP.A, Atlanta and Montreal, page 234, 3rd paragraph, R.P. Singh : A. Color Stripping).

In many cases, waste paper cannot be stripped sufficiently completely for a treatment by means of a peroxide compound in an alkaline medium and it is quite frequently necessary to resort to additional treatments which are often detrimental to the cellulosic matter.

The stripping of pulps originating from waste paper by means of hypochlorite, for its part, is responsible for a considerable degradation of cellulose fibres and limits the use of paper stripped in this way to lower quality paper grades.

SUMMARY OF THE INVENTION

The objective of the invention is to provide a process for stripping coloured waste paper which does not make use of a reactant containing active chlorine and which maintains the intrinsic qualities of the cellulose fibres.

To this end, the invention relates to a process for colour stripping and bleaching coloured waste paper, in which the coloured waste paper is treated by means of an oxidising reactant essentially comprising an aqueous solution of at least one peroxygen compound and of a halide ion, the peroxygen compound being selected from the group consisting of monoperoxysulphuric acid, any one of the salts of this acid, mixtures of two or more salts of this acid and mixtures of monoperoxysulphuric acid with at least one of its salts.

DETAILED DESCRIPTION OF THE PREFERRED EMBODIMENTS

Coloured waste paper is intended to denote woodfree paper, paper containing a high proportion of mechanical pulp or mixtures of those papers which have been subjected to a bulk-colouring treatment using a dye for cellulose fibres. This waste paper may originate from coloured broke as well as from waste paper collections. Wood-free waste paper gave good results.

In the process according to the invention, the treatment with monoperoxysulphuric acid or one of its salts consists in treating the waste paper with the inorganic acid corresponding to the formula $H_2SO_5$ (also called Caro's acid) or one of its alkali metal, alkaline-earth metal or ammonium salts, or with a mixture of a number of these salts or of monoperoxysulphuric acid with one or more of these salts. Potassium monoperoxysulphate gave good results.

In an advantageous alternative form of the process according to the invention, the monoperoxysulphuric acid or the salts which are used may have been prepared immediately before being used by reaction of a concentrated aqueous solution of sulphuric acid or of its salts with a concentrated aqueous solution of a peroxygen compound, for example hydrogen peroxide. Concentrated solutions are intended to denote solutions of $H_2SO_4$ with a concentration of at least approximately 10 moles per liter and of $H_2O_2$ with a concentration of at least approximately 20% by weight, respectively.

According to the invention the treatment of coloured waste paper by means of monoperoxysulphuric acid is performed in the presence of a halide ion. A halide ion is intended to denote any anion belonging to the class of the halogens or a mixture of at least two of these ions in any proportions. The halide ion will preferably be chosen from chloride, bromide and iodide ions or mixtures of at least two of these ions. The chloride ion is particularly preferred.

The halide ions are advantageously used in the form of alkali metal or alkaline-earth metal halides. All the alkali or alkaline-earth metals are suitable, because of their good solubility in water. Alternatively, an aqueous solution of a hydrogen halide may also be employed.

The quantity of monoperoxysulphuric acid or of one of its salts used in the process according to the invention is generally at least approximately 0.3 g per 100 g of dry pulp and preferably, at least approximately 0.5 g per 100 g of dry pulp. It is also appropriate that this quantity of monoperoxysulphuric acid or of one of its salts should not exceed approximately 3 g per 100 g of dry pulp and, preferably, approximately 2.8 g per 100 g of dry pulp.

The quantity of halide ions to be used depends on that of the peroxymonosulphuric acid or of one of its salts. In general, a quantity of halide ions of at least approximately 25% of the weight of peroxymonosulphuric acid or of one of its salts and, preferably, of at least approximately 50% of this weight, is suitable. It is also advantageous that this quantity of halide irons should not exceed approximately 150% of the weight of peroxymonosulphuric acid and, preferably, approximately 130% of this weight.

In a first alternative form of the process according to the invention, which is preferred, the treatment is performed using monoperoxysulphuric acid or one of its salts in a bleaching stage following the preliminary stage of pulping of the coloured waste paper.

In this alternative form, the waste paper is first of all pulped, in most cases in a pulper in the presence of chemical reactants. The reactants most commonly employed in the pulper are alkaline reactants such as sodium or calcium hydroxide or sodium carbonate.

At the end of this preliminary stage of treatment with chemical reactants, the waste paper takes the form of a pulp which can then, according to the invention, be subjected to a bleaching treatment by means of monoperoxysulphuric acid or one of its salts.

In another alternative form of the process according to the invention the treatment of the coloured waste paper by means of monoperoxysulphuric acid or one of its salts is performed in the pulper during the pulping of this waste paper.

The stage of pulping the coloured waste paper may optionally be followed by a stage of purification of the pulp, in order to rid it of a good proportion of the inks which it may contain. This purification stage is generally performed according to one of the well-known techniques for removing inks by washing or by flotation. The paper stripping stage according to the invention advantageously follows this ink removal stage.

When the pulp is subjected to a purification treatment after its pulping it may be advantageous to incorporate into the pulper at the pulping stage certain additives which will facilitate ink removal. If the purification is performed by washing, these additives may, for example, consist of dispersing agents intended for better removal of the ink particles in the washes. On the other hand, in the case where the inks are removed by a flotation treatment, these additives will preferably be chosen from collecting agents, foaming agents and sodium silicate, to assist in the debinding and separation of the ink particles in the foam which accumulates at the surface of the flotation cells.

The invention may be performed at very different pHs. The treatment of coloured waste paper by means of monoperoxysulphuric acid or one of its salts according to the invention is preferably performed at an acidic pH. An acidic pH is intended to denote a pH not exceeding approximately 3.5, and preferably 3. However, it is appropriate that the pH should not be exaggeratedly acidic, values of at least approximately 0.5, and preferably 1.5, being suitable.

In a variant it is possible, however, in an alternative but not preferred manner, to perform the treatment of the waste paper according to the invention by means of monoperoxysulphuric acid or one of its salts at higher pHs and even at a pH close to neutrality. In general, a pH of 8 will not be exceeded. This pH will in most cases lie below 7.5 and preferably below 7, for example at pH 6.

The examples which follow are given for the purpose of illustrating the invention without, however, limiting its scope. Examples 2 to 8 were carried out {1 according to the invention and example 1R was carried out, by way of comparison, under operating conditions using a colour stripping/bleaching reactant not in accordance with the invention.

EXAMPLE 1R : (not in accordance with the invention)

A sample of coloured waste paper of xerographic grade was pulped and washed. The washed pulp was beige in colour and the measurement of brightness gave the value of 50.3° GE (measured according to TAPPI Standard 452).

The pulp obtained was then treated with 1 g of NaClO and 0.5 g of NaOH per 100 g of dry pulp at a temperature of 60° C. and for 60 minutes at an initial pH of 11.8 and at a consistency of 12% as dry pulp.

After treatment the brightness of the pulp (in ° GE) was measured, together with its chromatic characteristics according to the Hunter L,a,b colorimetric system, its dominant wavelength (DWL in nm) and its viscosity (in cps) according to SCAN Standard C15:62. The results of the measurements were as follows:

|  | Untreated pulp | NaClO treated pulp |
| --- | --- | --- |
| Brightness, °GE | 50.3 | 78.4 |
| L | 83.5 | 94.1 |
| a | 3.8 | −0.2 |
| b | 12.7 | 5.6 |
| DWL, nm | 581.9 | 576.9 |
| viscosity, cps | 14.5 | 7.2 |

EXAMPLE 2: (in accordance with the invention)

The same sample of washed coloured waste paper pulp as that employed in Example 1R was treated for 60 minutes at 60° C., at an initial pH of 2.7, with 1 g of potassium monoperoxysulphate (KMPS) and with 0.5 g of hydrochloric acid per 100 g of solids content and at a consistency of 12% as dry pulp.

At the end of the test, the same measurements as in test 1R were performed on the treated pulp. The results of these measurements were as follows:

|  | KMPS/Cl⁻ treated pulp |
| --- | --- |
| Brightness, °GE | 78.5 |
| L | 94.3 |
| a | 0.2 |
| b | 6.3 |
| DWL, nm | 577.9 |
| viscosity, cps | 8.9 |

It can be seen that the treatment according to the invention has made it possible to strip the colour from the pulp as effectively as the hypochlorite treatment while considerably limiting the decrease in viscosity.

EXAMPLES 3 to 8: (according to the invention)

The effect of a colour stripping treatment was investigated on the same sample of washed pulp as in example 1R at a consistency of 12% of dry solids and at pH 2 adjusted with sulphuric acid, the four conditions of temperature, duration, quantities of monoperoxysulphate and of chloride ions (incorporated in the form of NaCl) being varied.

Each test was followed by an analysis of the treated pulp with a view to the determination of the brightness value, of the coefficient L, of the coefficient b and of the viscosity.

The conditions chosen and the results measured are given in Table 1, which follows.

| Test No. | Temp. °C. | Time Min | % KMPS | % Cl⁻ | Brightness °GE | Coeff. L | Coeff. b | DWL nm | Viscos. cps |
|---|---|---|---|---|---|---|---|---|---|
| 3 | 51.7 | 105 | 1.13 | 0.38 | 81.6 | 94.9 | 4.6 | 577.6 | 10.9 |
| 4 | 51.7 | 45 | 1.13 | 1.13 | 82.0 | 94.9 | 4.4 | 577.3 | 10.7 |
| 5 | 65.6 | 75 | 0.75 | 0.75 | 83.4 | 95.3 | 4.0 | 577.4 | 10.8 |
| 6 | 65.6 | 135 | 0.75 | 0.75 | 83.3 | 96.4 | 4.2 | 577.3 | 10.9 |
| 7 | 65.6 | 75 | 0.75 | 1.50 | 83.7 | 95.4 | 3.9 | 577.8 | 11.0 |
| 8 | 93.3 | 75 | 0.75 | 0.75 | 81.6 | 94.9 | 4.8 | 577.7 | 8.7 |

We claim:

1. A process for color stripping and bleaching of colored waste paper, wherein the colored waste paper is treated by an oxidizing reactant comprising an aqueous solution of (a) at least one peroxygen compound selected from the group consisting of monoperoxysulfuric acid and alkali metal, alkaline-earth metal, and ammonium salts thereof; and (b) a halide ion.

2. The process as claimed in claim 1, wherein the colored waste paper is first of all pulped in a preliminary stage and is then treated in a bleaching stage following the preliminary stage of pulping of the colored waste paper.

3. The process as claimed in claim 1, wherein the treatment is performed in a pulper during a preliminary stage of pulping of the colored waste paper.

4. The process as claimed in claim 1, wherein the treatment is performed in an acidic medium at a pH not exceeding approximately 3.5.

5. The process as claimed in claim 2, wherein the treatment is performed at a pH of between 6 and 7.5.

6. The process as claimed in claim 1, wherein the treatment is performed by means of potassium monoperoxysulphate.

7. The process as claimed in claim 1, wherein the halide ion is used in the form of a halide of at least one alkali or alkaline-earth metal.

8. The process as claimed in claim 1, wherein the halide ion is selected from chloride, bromide and iodide ions and mixtures of these ions.

9. The process as claimed in claim 8, wherein the halide ion is a chloride ion.

10. The process as claimed in claim 1, wherein the treatment of waste paper is applied to a pulp which has previously been subjected to an operation of ink removal chosen from washing or flotation.

* * * * *